United States Patent
Sakuragi (10) Patent No.: US 10,036,842 B2
(45) Date of Patent: Jul. 31, 2018

(54) ILLUMINATION DEVICE

(71) Applicant: Stanley Electric Co., Ltd., Tokyo (JP)

(72) Inventor: Kazuyoshi Sakuragi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 105 days.

(21) Appl. No.: 15/005,075

(22) Filed: Jan. 25, 2016

(65) Prior Publication Data

US 2016/0216431 A1    Jul. 28, 2016

(30) Foreign Application Priority Data

Jan. 26, 2015    (JP) .................................. 2015-012099

(51) Int. Cl.
*F21V 7/04* (2006.01)
*F21V 8/00* (2006.01)

(52) U.S. Cl.
CPC ........... *G02B 6/0006* (2013.01); *G02B 6/001* (2013.01)

(58) Field of Classification Search
CPC .............................. G02B 6/0006; G02B 6/001
See application file for complete search history.

(56) References Cited

U.S. PATENT DOCUMENTS

| | | | | |
|---|---|---|---|---|
| 8,740,427 B2* | 6/2014 | Fritz | .................... | B60Q 1/2665 362/494 |
| 2003/0147254 A1* | 8/2003 | Yoneda | .................. | G01B 11/00 362/551 |
| 2010/0157619 A1* | 6/2010 | Chinniah | ............... | G02B 6/001 362/551 |
| 2011/0058385 A1* | 3/2011 | Kazaoka | .............. | B60Q 1/2665 362/540 |

FOREIGN PATENT DOCUMENTS

JP    2013-235775 A    11/2013
JP    2014-86333 A    5/2014

* cited by examiner

*Primary Examiner* — Elmito Breval
*Assistant Examiner* — Naomi M Wolford
(74) *Attorney, Agent, or Firm* — Kenealy Vaidya LLP (57) ABSTRACT

An illumination device can prevent light from leaking at a bend portion of a light guiding lens. The illumination device can include an LED and the light guiding lens for guiding light from the LED. The light guiding lens can include a light guiding portion extending in a predetermined extension direction and having a first end face and a second end face so as to guide the light entered through the first end face in the extension direction, and a bend portion continued from the second end face of the light guiding portion and bent in an arc shape. An incident face is disposed in the first end face to receive the light from the LED and to be incident on an inner surface of the bend portion on an outer side of the arc shape at an angle of incidence equal to or more than a critical angle.

21 Claims, 9 Drawing Sheets

FIG. 10D

ILLUMINATION DEVICE

This application claims the priority benefit under 35 U.S.C. § 119 of Japanese Patent Application No. 2015-012099 filed on Jan. 26, 2015, which is hereby incorporated in its entirety by reference.

TECHNICAL FIELD

The presently disclosed subject matter relates to an illumination device including a light guiding lens bent in a part thereof.

BACKGROUND ART

Some of conventional vehicular illumination devices include a long light guiding lens.

In general, this type of illumination device can include a light emitting diode as a light source and a light guiding lens has an end face to which the light emitting diode faces. The light emitted from the light emitting diode can enter the light guiding lens through the end face to illuminate the light guiding lens with the light. Japanese Patent Application Laid-Open No. 2013-235775 discloses this type illumination device.

By the way, the illumination devices in recent years have parts layout within the device the usable area of which is limited due to the miniaturization and multifunctionality as well as the requirement in heat dissipation measures accompanying with the high optical output of the light source. In order to dispose the light source suitable for such an illumination device with a long bent light guiding lens, it is necessary to bend the long light guiding lens at a position near the light source.

In this case, the bend portion of the light guiding lens should be formed at a curved area or corner area in order not to prevent the light from being guided therethrough. However, if the light emitted from the light source and entering the light guiding lens is random light uncontrolled, part of the light may be incident on an inner face of the bend portion on the outer side at an angle less than the critical angle, resulting in leakage of light to the outside of the light guiding lens through that portion.

Even when the light emitted from the light source and entering the light guiding lens is parallel light along the portion of the light guiding lens up to the bend portion, if the bend portion is formed by being bent by a sharp angle, part of the light may still be incident on an inner face of the bend portion on the outer side at an angle less than the critical angle, resulting in leakage of light to the outside of the light guiding lens.

SUMMARY

The presently disclosed subject matter was devised in view of these and other problems and features in association with the conventional art. According to an aspect of the presently disclosed subject matter, an illumination device can prevent light from being leaked at a bend portion of a light guiding lens.

According to another aspect of the presently disclosed subject matter, the illumination device can include an LED and a light guiding lens configured to guide light emitted from the LED. The light guiding lens can include a light guiding portion and a bend portion. The light guiding portion can be configured to extend in a predetermined extension direction and have a first end face and a second end face so as to guide the light having entered the light guiding lens through the first end face in the extension direction. The bend portion can be configured to be continued from the second end face of the light guiding portion and bent in an arc shape. The light guiding portion can further include an incident face disposed in the first end face, the incident face allowing the light from the LED to enter the light guiding lens and to be incident on an inner surface of the bend portion on an outer side of the arc shape at an angle of incidence equal to or more than a critical angle.

Here, the "inner surface of the bend portion on the outer side of the arc shape" means a surface of the bent curved portion (arc) on the outer side (larger diameter side), and may sometimes be called "outer peripheral-side face" in the specification.

Furthermore, according to another aspect, the illumination device of the above-mentioned aspect can be configured such that: the incident face is configured to allow the light from the LED to enter the light guiding lens while collimating the light substantially along the extension direction; the bend portion is configured to include a total reflection region on the inner surface thereof on the outer side of the arc shape where the light collimated along the extension direction can be incident on at the angle of incidence equal to or more than the critical angle; and the incident face is disposed in the first end face in a position corresponding to a position within the total reflection region closer to the first end face.

Furthermore, according to another aspect, the illumination device of any of the above-mentioned aspects can be configured to include a condenser lens that is disposed between the LED and the light guiding portion of the light guiding lens and be configured to condense the light from the LED to the incident face.

Furthermore, according to still another aspect, the illumination device of the previous aspect can be configured to include a connection part configured to connect the light guiding lens and the condenser lens at respective side faces. In this case, the light guiding lens, the condenser lens, and the connection part can be integrally formed together.

Furthermore, according to another aspect, the illumination device of any of the above-mentioned aspects can be configured to further include a third lens disposed between the light guiding lens and the condenser lens.

Furthermore, according to still another aspect, the illumination device of the above-mentioned aspect can be configured such that the incident face of the light guiding portion is disposed on an outer side face of the light guiding portion, and that the light guiding portion includes, in the first end face, a total reflection face configured to totally reflect the light having entered through the incident face so as to be directed to and incident on the inner surface of the bend portion on the outer side of the arc shape at an angle of incidence equal to or more than the critical angle.

Furthermore, according to another aspect, the illumination device of any of the above-mentioned aspects can be configured such that the light guiding lens can be a light guiding rod-shaped member having a long rod shape.

Furthermore, according to another aspect, the illumination device of any of the above-mentioned aspects can be configured such that the light guiding lens can further include a light emission portion on an opposite side of the light guiding portion via the bend portion.

According to the presently disclosed subject matter, the light emitted from the LED can enter the light guiding lens through the incident face and be guided through the light guiding portion of the light guiding lens. Then, the light guided can be incident on an inner surface on the outer peripheral side of the bend portion at an angle of incidence equal to or more than the critical angle.

Therefore, the light having been guided through the light guiding portion can be totally reflected appropriately on the outer peripheral-side face of the bend portion without the light being leaked to the outside of the light guiding lens therethrough.

Thus, even when the illumination device includes a sharply bent light guiding lens, the light can be prevented from being leaked to the outside at the bend portion.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to illumination devices of the presently disclosed subject matter with reference to the accompanying drawings in accordance with exemplary embodiments.

In the specification, the directions are defined on the basis of a light source that can emit light downward (forward in terms of travelling light and also referred to as a Z direction) and a light guiding lens of which an incident face faces upward (rearward in terms of travelling light) and of which a light exiting face is located forward.

Figure 1:
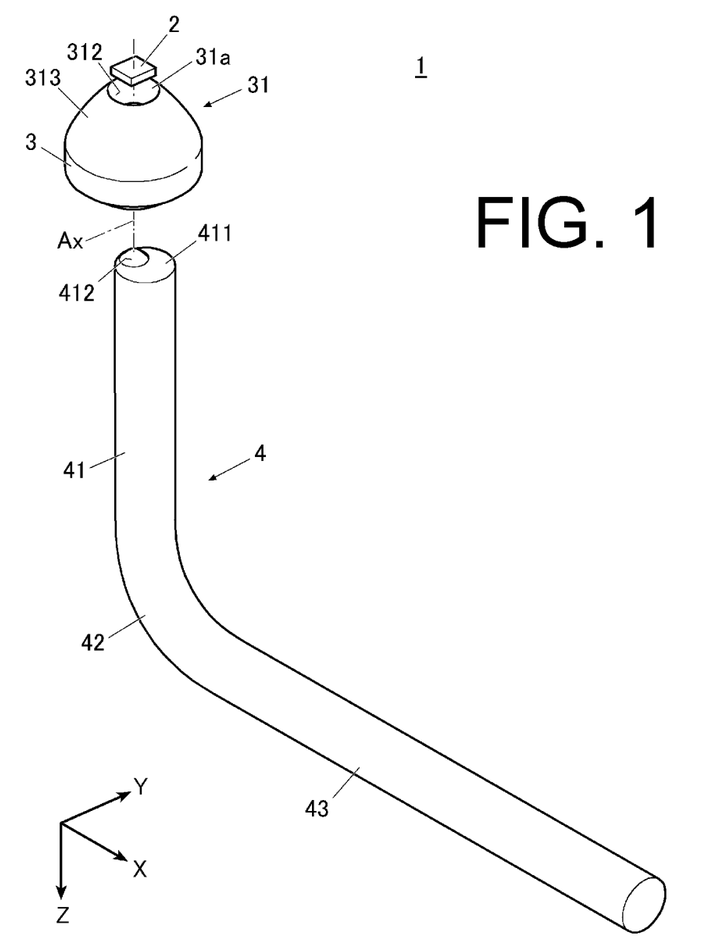
FIG. 1 is a perspective view of an illumination device of an exemplary embodiment made in accordance with principles of the presently disclosed subject matter.
Figure 2:
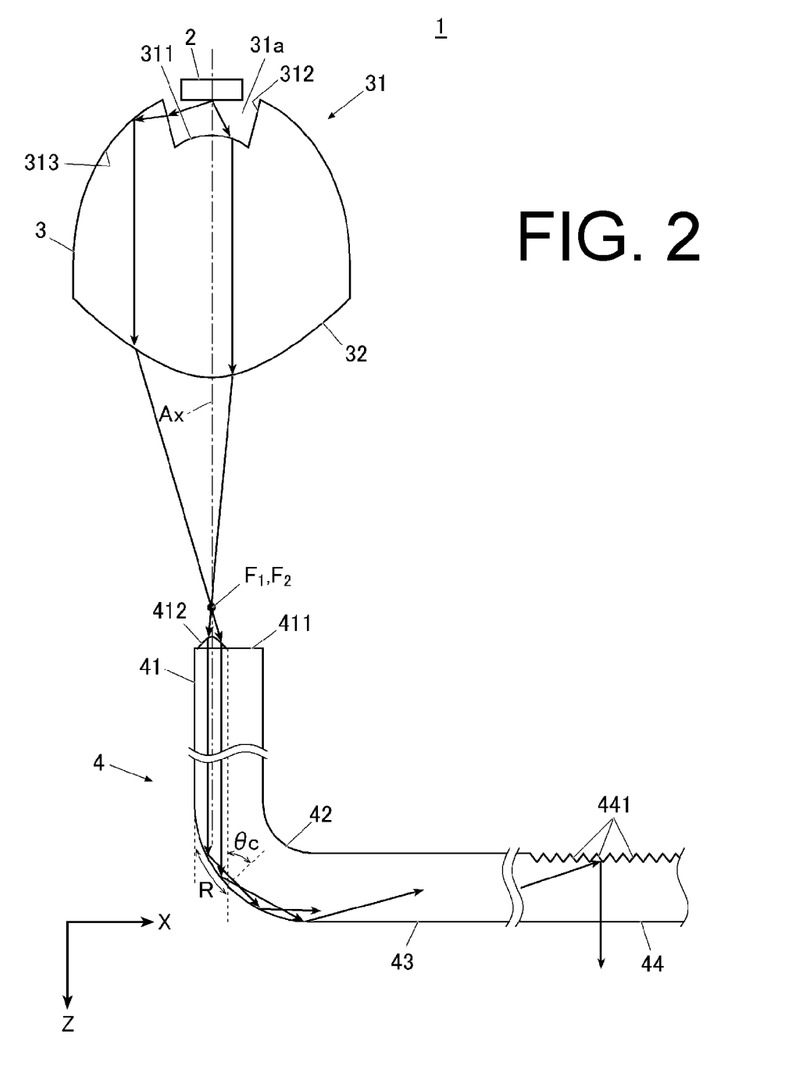
FIG. 2 is a vertical cross-sectional view of the illumination device in the exemplary embodiment.
Figure 3:
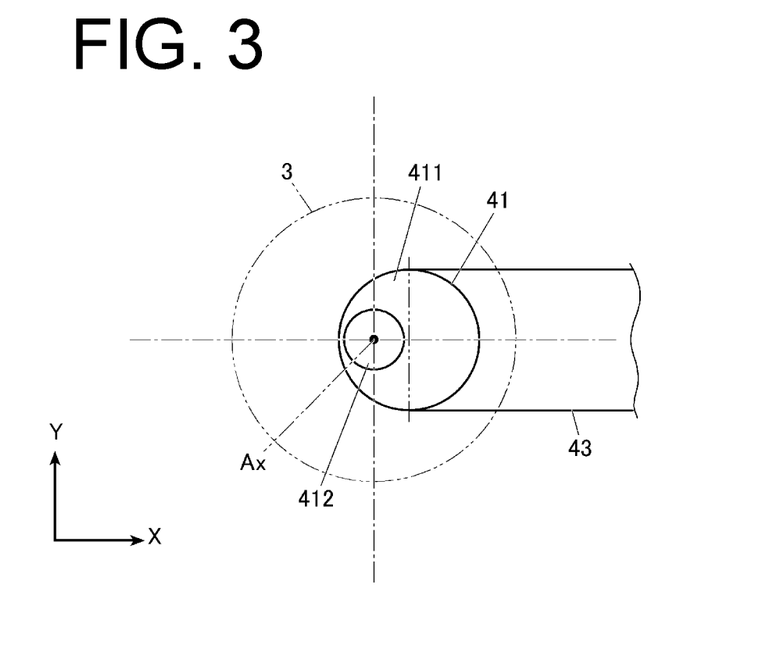
FIG. 3 is a plan view of a light guiding lens in the exemplary embodiment.

FIG. 1 is a perspective view illustrating essential parts of an illumination device 1 of an exemplary embodiment made in accordance with the principles of the presently disclosed subject matter. FIG. 2 is a vertical cross-sectional view of the illumination device in the exemplary embodiment (a cross-sectional view perpendicular to a Y direction to be described later). FIG. 3 is a plan view of a light guiding lens 4 provided to the illumination device 1 when observed in a Z direction to be described later.

As illustrated in FIGS. 1 and 2, the illumination device 1 can include a light emitting diode (LED) 2 serving as a light source, a condenser lens 3 configured to condense the light from the LED 2, and the light guiding lens 4 configured to be illuminated with light condensed by the condenser lens 3.

The LED 2 can have an optical axis Ax to be disposed along an arrow Z in the drawing (herein, called the "Z direction"). The LED 2 can emit light in the Z direction radially around the optical axis Ax.

The condenser lens 3 can have an optical axis Ax coincident with the optical axis Ax of the LED 2. The condenser lens 3 can be formed in an axial symmetric shape with the optical axis Ax serving as an axis of symmetry. The condenser lens 3 can be disposed in the Z direction with respect to the LED 2 and configured to condense the light emitted from the LED 2 toward the light guiding lens 4.

The condenser lens 3 can include a light incident portion 31 on the rear side in the Z direction. The light incident portion 31 can allow the light emitted from the LED 2 to enter the condenser lens 3 therethrough. The light incident portion 31 can be formed to project rearward in the Z direction with a rotationally symmetrical shape with the optical axis Ax serving as a rotationally symmetrical axis and can have an opening 31a opened rearward in the Z direction.

The opening 31a can face to the LED 2 and have a bottom portion where a first incident face 311 can be formed. The first incident face 311 can be projected rearward in the Z direction (convex) to be an aspheric surface and can be symmetric with the optical axis Ax serving as a rotationally symmetrical axis. The first incident face 311 can be configured to have a focal point at or near the LED 2. Thus, the light emitted from the LED 2 can be incident on the first incident face 311 to be collimated substantially along the optical axis AX and enter the light incident portion 31 of the condenser lens 3.

A second incident face 312 can be formed in an inner peripheral face of the opening 31a. The second incident face 312 can be configured to extend from the peripheral edge of the first incident face 311 rearward in the Z direction while being widened. The second incident face 312 can receive the light that is emitted from the LED 2 in a direction more sideward than that directed to the first incident face 311.

The light incident portion 31 can have an outer peripheral surface that serves as a reflection surface 313. Specifically, the reflection surface 313 of the light incident portion 31 can be a curved surface extending from the tip of the periphery of the second incident face 312 forward in the Z direction while being widened outward with respect to the optical axis Ax. The reflection surface 313 can be configured to totally and internally reflect the light having entered the light incident portion 31 through the second incident face 312 so that the reflected light travels substantially along the optical axis Ax.

The light incident portion 31 with this configuration can cause the light emitted from the LED 2 to be collimated substantially along the optical axis Ax while entering the condenser lens 3.

The condenser lens 3 can also include a light emission face 32 at the front face thereof in the Z direction. The light emission face 32 can allow the light through the condenser lens 3 to exit therethrough. The light emission face 32 can be formed to be projected forward in the Z direction (convex in the Z direction) with its focal point $F_1$ located on the optical axis Ax forward in the Z direction. Therefore, the light emission face 32 can cause the light that has entered through the light incident portion 31 and travelled through the condenser lens 3 while being collimated substantially along the optical axis Ax to exit therethrough in the Z direction while being condensed to the focal point $F_1$.

The light guiding lens 4 can be a light guiding rod-shaped member having a circular cross section with a diameter smaller than that of the condenser lens 3. The light guiding lens 4 can receive the light from the condenser lens 3 to guide the light along its lengthwise direction so as to cause the light to exit through a light emission portion 44 to be described later.

Specifically, the light guiding lens 4 can include a first light guiding portion 41 extending in the Z direction, a bend portion 42 that is bent at a predetermined angle, such as 90 degrees in the illustrated embodiment, a second light guiding portion 43 extending in a direction along an arrow X perpendicular to the Z direction (hereinafter, called "X direction"), and the light emission portion 44, which are continued in this order from the side of the condenser lens 3.

The first light guiding portion 41 can be located in the Z direction with respect to the condenser lens 3. Specifically, the first light guiding portion 41 can have a center axis as illustrated in FIGS. 2 and 3 such that the position of the center axis in a direction along an arrow Y in the drawings perpendicular to both the X and Z directions (hereinafter, called "Y direction") is coincident with the optical axis Ax while the position of the center axis in the X direction is disposed forward in the X direction with respect to the optical axis Ax. FIG. 3 illustrates the center axis of the first light guiding portion 41 (circle center) with respect to the optical axis Ax.

The first light guiding portion 41 can have a rear end face (first end face) 411 on the rear side in the Z direction. The rear end face 411 can be formed in a flat plate shape perpendicular to the Z direction and can include an incident face 412.

The incident face 412 can be projected rearward in the Z direction (convex) and can be symmetric with the optical axis Ax serving as a rotationally symmetrical axis. The incident face 412 can have a focal point $F_2$ located at or near the same position as the focal point $F_1$ of the light emission face 32 of the condenser lens 3. In the illustrated embodiment, the focal distance of the incident face 412 can be shorter than that of the light emission face 32 of the condenser lens 3. The incident face 412 can be configured to cause the light that has exited the condenser lens 3 forward in the Z direction and be condensed to the focal point $F_1$ to enter the first light guiding portion 41 of the light guiding lens 4 while being collimated substantially along the Z direction.

The incident face 412 can be located in the rear end face 411 of the first light guiding portion 41 on the rear side in the X direction with respect to the center axis of the first light guiding portion 41. Specifically, the incident face 412 can be configured such that the light entering the first light guiding portion 41 through the incident face 412 (while being collimated along the Z direction) can be incident on an outer peripheral-side face (outside surface of the bent arc) of the bend portion 42, which is continued from the front end (second end face) of the first light guiding portion 41 in the Z direction, at an angle of incidence equal to or more than a critical angle θc. In order to achieve this, the incident face 412 can be disposed in the rear end face 411 of the first light guiding portion 41 on a side opposite to the bending direction of the bend portion 42 (i.e., on the rear side in the X direction with respect to the center axis of the first light guiding portion 41). In other words, the incident face 412 can be disposed in a position corresponding to a rear-side position within a total reflection region R of the outer peripheral-side face of the bend portion 42, where the light from the first light guiding portion 41 can be incident at an angle of incidence equal to or more than the critical angle θc. FIG. 2 illustrates a cross section of the part including the total reflection region R cut along a plane including the optical axis Ax and perpendicular to the Y direction.

In the illustrated exemplary embodiment, out of the light guided within the first light guiding portion 41 along the Z direction, the light travelling on the rear side with respect to the center axis of the first light guiding portion 41 in the X direction can be incident on the outer peripheral-side face of the bend portion 42 at an angle of incidence equal to or more than the critical angle θc. Therefore, the total reflection region R can be a region of the outer peripheral-side face of the bend portion 42 on the rear side in the X direction with respect to a position where light is incident on the outer peripheral-side face of the bend portion 42 at the critical angle θc.

The bend portion 42 can be a portion configured to connect the front end (the second end face in the Z direction) of the first light guiding portion 41 to the rear end (in the X direction) of the second light guiding portion 43. The bend portion 42 can be formed in an arc shape with a predetermined radius of curvature by a predetermined bent angle (90 degrees in the illustrated embodiment) while having the same cross section as those of the first and second light guiding portions 41 and 43 (a circular cross section in the illustrated embodiment).

The bend portion 42 may be bent at any bent angle and at any other radius of curvature as long as the bend portion 42 is sharply bent while having the same cross section. The term "sharply bent" herein means a degree of bending such that the bend portion 42 is bent such that part of the light guided through the first light guiding portion 41 (through the entire cross section thereof) along the Z direction can be incident on the outer peripheral-side face of the bend portion 42 at an angle of incidence less than the critical angle θc and leak out of the light guiding lens 4. Note that the degree of bending to cause the light to leak out may depend on the refractive index of the light guiding lens 4, the wavelength of the incident light, etc.

The light emission portion 44 can be formed to be continued from the front end of the second light guiding portion 43 in the X direction, so as to extend in the X direction like the second light guiding portion 43. The light emission portion 44 can have a rear-side face on the rear side in the Z direction (upper side in the drawing) so as to have a plurality of lens cuts 441 formed along the lengthwise direction of the light emission portion 44 side by side. The light emission portion 44 with this configuration can cause the light guided through the second light guiding portion 43 to be internally reflected by the plurality of lens cuts 441 and exit the light emission portion 44 through a front-side face thereof in the Z direction.

In the illumination device 1 with the above-described configuration, the LED 2 can emit light in the Z direction, and the light can enter the condenser lens 3 and be condensed at the focal point $F_1$ on the optical axis Ax by the same.

The condensed light can enter the first light guiding portion 41 through the incident face 412 that has the focal point $F_2$ located at or near the same position as the focal point $F_1$ of the condenser lens 3 while being collimated along the Z direction.

The light having entered the first light guiding portion 41 can be guided through the first light guiding portion 41 in the Z direction and then internally (totally) reflected by the outer peripheral-side face of the bend portion 42 to enter the second light guiding portion 43.

In this case, the incident face 412 of the first light guiding portion 41 can be located in the position corresponding to the rear-side position within the total reflection region R of the outer peripheral-side face of the bend portion 42. Therefore, the collimated light from the first light guiding portion 41 can be incident on the outer peripheral-side face of the bend portion 42 at an angle of incidence equal to or more than the critical angle θc, to thereby be totally reflected by the outer peripheral-side face without leakage out to the light guiding lens 4.

The light totally reflected by the bend portion 42 can enter the second light guiding portion 43 and be guided therethrough in a random manner to enter the light emission portion 44. Then, the light can be internally reflected by the plurality of lens cuts 441 to exit the light guiding lens 4 through the front-side face opposite to the lens cuts 441 in the Z direction forward.

A description will now be given of the leakage prevention effect of light at the bend portion 42 with reference to simulation results.

The simulation using a ray tracing software can analyze the light ray loci in a 3-D model of the illumination device 1. In the simulation, assume that the condenser lens and the light guiding lens 4 are made of an acrylic resin, in particular, PMMA; the radius of curvature of the outer peripheral-side face of the bend portion 42 is 10 mm; and the LED 2 is a white LED and the spectral data thereof used is actual data measured using an integrating sphere.

At the same time, light ray loci of a conventional illumination device (light guiding lens) were analyzed as a comparison. In the analysis, light ray loci were determined when not collimated light but random light was caused to be incident on a light guiding lens having the same configuration as that of the light guiding lens 4 except for the omission of the incident face 412.

Figure 4A:
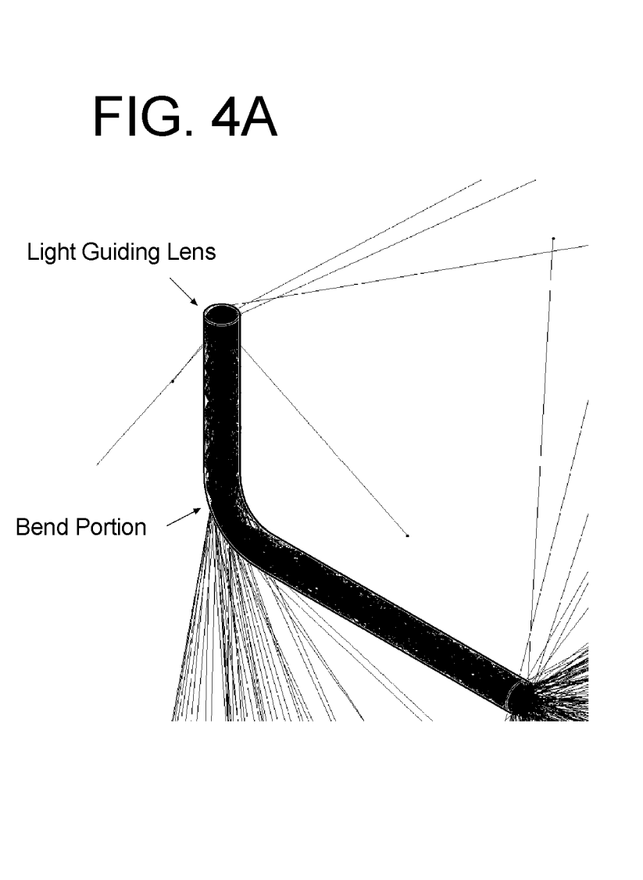
FIGS. 4A and 4B are each a diagram showing the simulation results with FIG. 4A illustrating light ray loci of a conventional illumination device (light guiding lens) and FIG. 4B illustrating light ray loci of the illumination device in the exemplary embodiment.
Figure 4B:
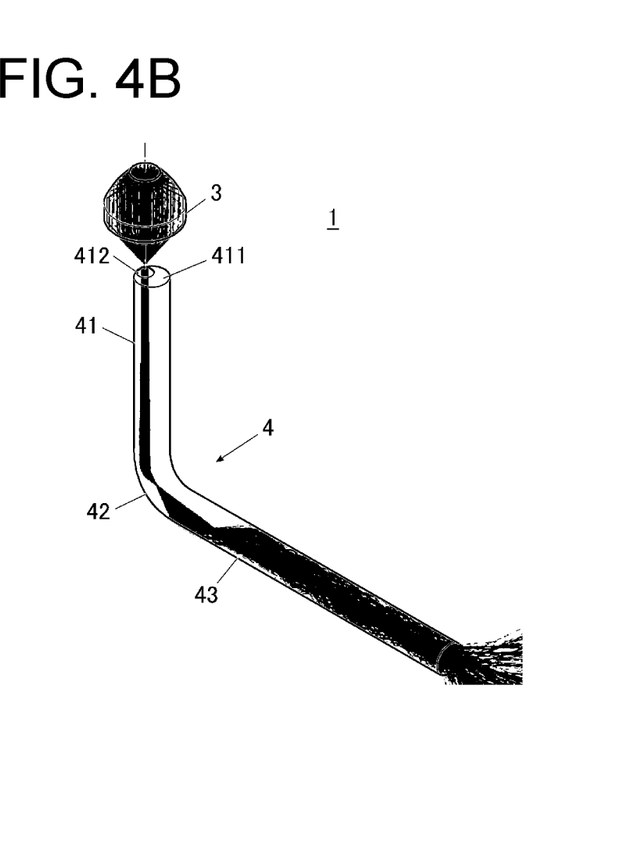

FIGS. 4A and 4B are each a diagram showing the simulation results with FIG. 4A illustrating light ray loci of the conventional illumination device (light guiding lens) and FIG. 4B illustrating light ray loci of the illumination device 1 in the exemplary embodiment. In FIGS. 4A and 4B, the light source LED 2 is not illustrated for facilitating understanding.

As illustrated in FIG. 4A, when random light was caused to enter the light guiding lens, the light was guided through the entire cross section of the light guiding lens freely. Therefore, there was certain light that was incident on the outer peripheral-side face of the bend portion at an angle of incidence less than the critical angle, and this light leaked out of the light guiding lens without being totally reflected by the outer peripheral-side face of the bend portion (see FIG. 4A).

On the contrary, as illustrated in FIG. 4B, since the illumination device 1 of the present exemplary embodiment can include the light guiding lens 4 with the above-described configuration, the collimated light entering through the incident face 412 of the first light guiding portion 41 can be guided not through the entire cross section of the light guiding portion 41 but through a part thereof and then be incident on the outer peripheral-side face of the bend portion 42 at an angle of incidence equal to or more than the critical angle θc, to thereby be totally reflected by the outer peripheral-side face without leakage out to the light guiding lens 4 in an advantageous manner.

If the outer peripheral-side face of the bend portion 42 is inclined by 45 degrees with respect to the X and Z directions, the light can be totally reflected by the outer peripheral-side face without light leakage. However, in this case, the light totally reflected may be kept as collimated light, resulting in failure in impinging on the lens cuts 441 of the light emission portion 44 in part. As a result, part of the light cannot exit through the light emission portion 44 or the emission of the light cannot be uniform.

As described above, the illumination device 1 of the present exemplary embodiment can be configured such that the light emitted from the LED 2 can be condensed by the condenser lens 3 and incident on the incident face 412 of the first light guiding portion 41 of the light guiding lens 4 to enter the first light guiding portion 41 and be guided therethrough. Then, the light can be incident on the outer peripheral-side face of the bend portion 42 at an angle of incidence equal to or more than the critical angle θc.

Therefore, the light guided through the first light guiding portion 41 can be advantageously, totally reflected by the outer peripheral-side face of the bend portion 42 without leakage out to the light guiding lens 4 so as to be guided to the second light guiding portion 43.

Thus, even when the illumination device 1 includes the sharply bent light guiding lens 4, the light can be prevented from being leaked to the outside at the bend portion 42.

Furthermore, the incident face 412 of the first light guiding portion 41 can be configured to cause the light from the condenser lens 3 to enter the first light guiding portion 41 while being collimated along the Z direction, which is the direction along which the first light guiding portion 41 extends. Accordingly, the optical path length within the first light guiding portion 41 can be shortened when compared with the conventional case where the light is incident on the incident face as random light.

This configuration can reduce the amount of short-wavelength component of light absorbed by the light guiding lens 4. Thus, the color change of light, which is prominent when high-power light at a wider wavelength region, such as white light, is used, can be suppressed.

Furthermore, the light emitted from the LED 2 can be condensed at the incident face 412 of the light guiding lens 4 by the condenser lens 3, and accordingly, the light can be effectively made incident on the light guiding lens 4 having the small cross section, thereby improving the light utility efficiency.

Japanese patent application laid-open No. 2014-086333 discloses a technique for guiding light from a large light-entering portion to a small light guiding portion (light-exiting portion) with a tapered structure narrow from the light-entering portion to the light-exiting portion. However, this structure requires a certain tapered length in accordance with the size ratio between the light-entering portion and the light-exiting portion, resulting in increased lens size. On the contrary, the illumination device 1 of the present exemplary embodiment can avoid the increased lens size by adjusting the focal point and distance and the like between the condenser lens 3 and the light guiding lens 4.

A description will now be given of several modified examples of the above-described exemplary embodiment.

Modified Example 1

Figure 5:
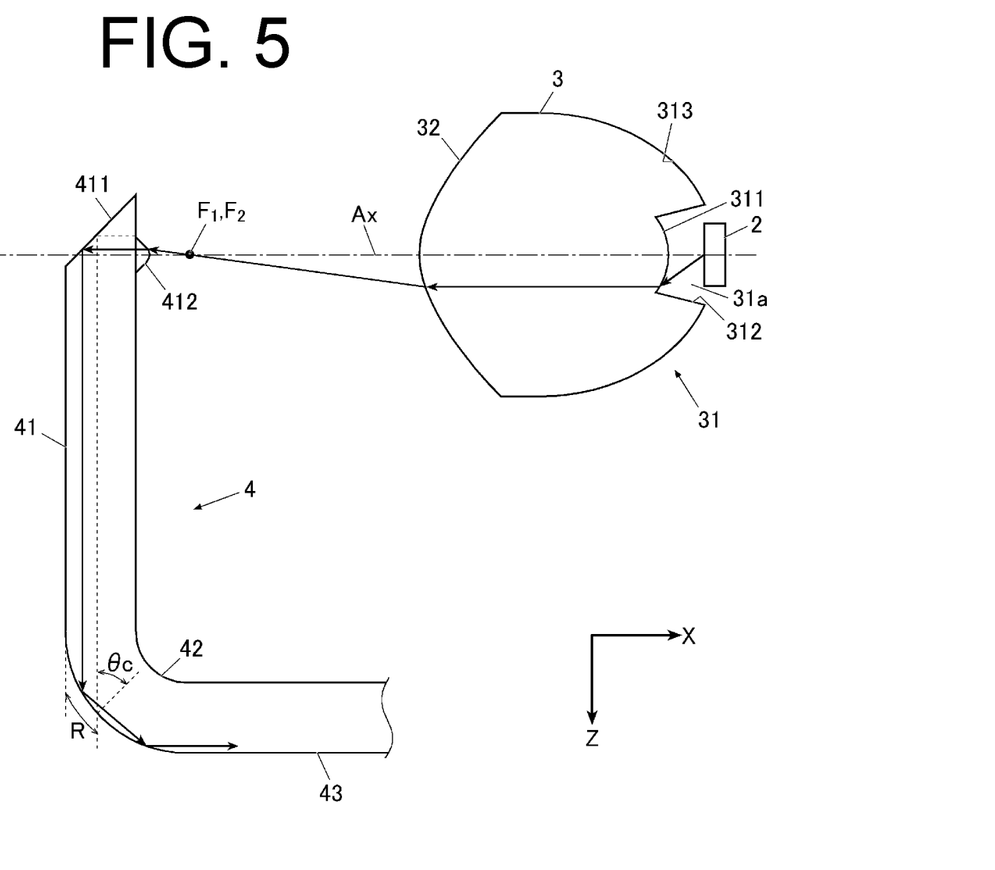
FIG. 5 is a diagram illustrating a modified example 1 of the illumination device in the exemplary embodiment.

The light guiding lens 4 can be formed with another configuration as long as the light through the incident face 412 reaches and is incident on the outer peripheral-side face of the bend portion 42 at an angle of incidence equal to or more than the critical angle θc. For example, the light can be incident on the outer peripheral-side face of the bend portion 42 not directly from the incident face 412.

FIG. 5 is a diagram illustrating a modified example 1 of the illumination device 1 in the exemplary embodiment wherein the light entering the light guiding lens 4 through the incident face 412 can be incident on the outer peripheral-side face of the bend portion 42 via another total reflection face. Specifically, the incident face 412 can be disposed on the outer side surface of the first light guiding portion 41, and the LED 2 and the condenser lens 3 can be disposed to be opposite to the incident face 412 as illustrated in FIG. 5. Furthermore, the rear end face 411 can be inclined at a predetermined angle to face to the incident face 412 so that the light emitted from the LED 2 and condensed by the condenser lens 3 can be incident on the incident face 412 to enter the light guiding lens 4 while being collimated, and the collimated light can be totally reflected by the inclined rear end face 411 to be directed to the total reflection region R of the bend portion 42.

The configuration like this can improve the design (layout) degree of freedom of the LED 2, the condenser lens 3, etc.

Modified Example 2

Figure 6:
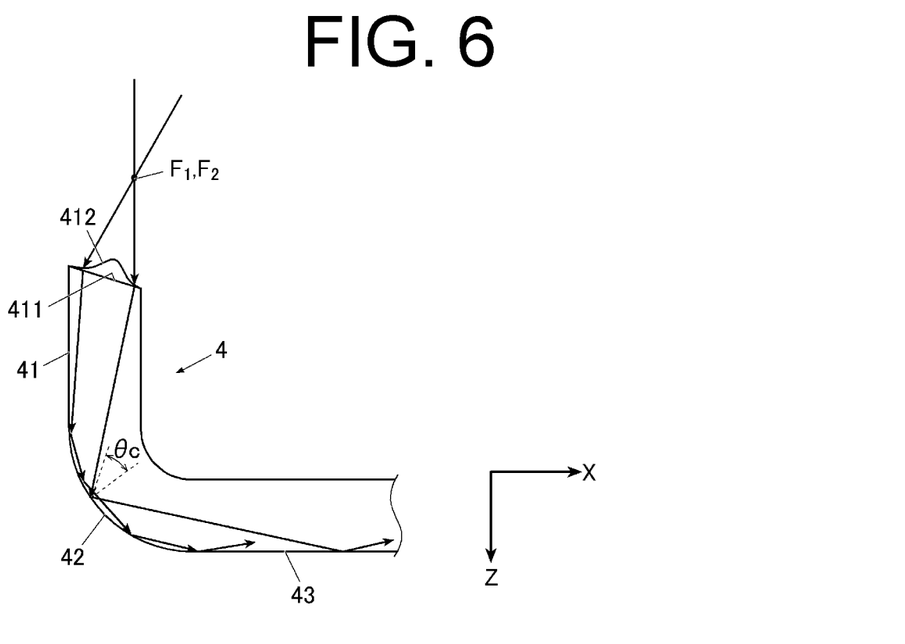
FIG. 6 is a diagram illustrating a modified example 2 of the illumination device in the exemplary embodiment.

The light guiding lens 4 can be formed with another configuration as long as the light through the incident face 412 reaches and is incident on the outer peripheral-side face of the bend portion 42 at an angle of incidence equal to or more than the critical angle θc. For example, the light may not be collimated.

FIG. 6 is a diagram illustrating a modified example 2 of the illumination device 1 in the exemplary embodiment wherein the incident face 412 can be formed on a rear end face 411 slightly inclined forward in the X direction such that the light flux slightly narrowed can be incident on a portion on the rear side in the X direction out of the outer peripheral-side face of the bend portion 42. In this case, not illustrated, the LED 2 and the condenser lens 3 should be located according to the position of the inclined incident face 412.

Furthermore, the modified example 1 can be applied to the modified example 2 so that the slightly narrowed light flux can be incident on the outer peripheral-side face of the bend portion 42 via the total reflection face.

This configuration can reduce the cost for manufacturing the optical system because there is no need to achieve so high an optical accuracy for making the light collimated accurately. Furthermore, the layout degree of freedom can be increased.

Modified Example 3

Figure 7:
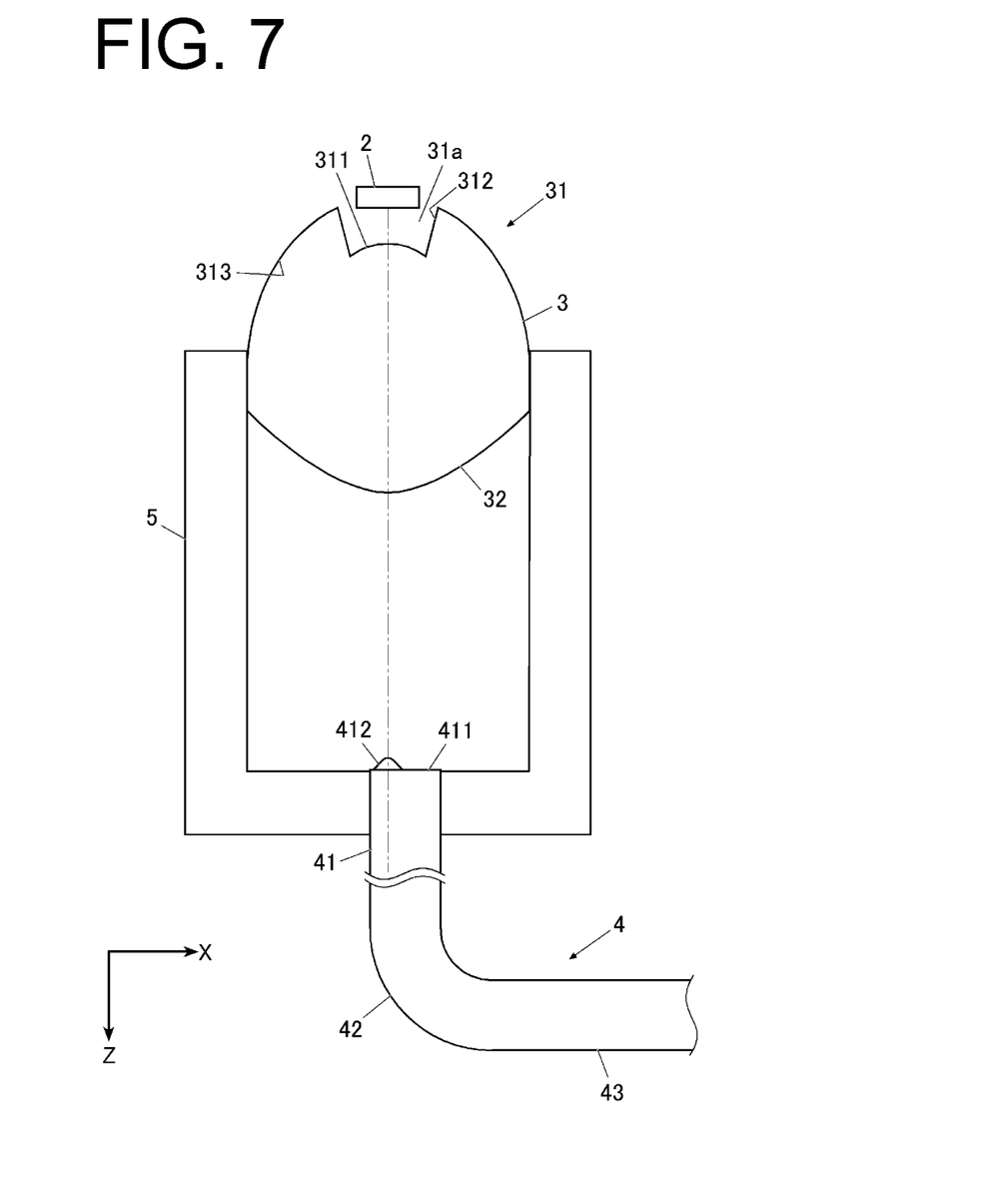
FIG. 7 is a diagram illustrating a modified example 3 of the illumination device in the exemplary embodiment.

The condenser lens 3 and the light guiding lens 4 can be integrally configured, as illustrated in FIG. 7. Specifically, FIG. 7 is a diagram illustrating a modified example 3 of the illumination device 1 in the exemplary embodiment wherein they can be connected by a connector 5 disposed between the outer peripheries of the condenser lens 3 and the rear end portion of the first light guiding portion 41. In this case, the light guiding lens, the condenser lens, and the connection part are integrally formed together, for example, molding.

This configuration can allow the condenser lens 3 and the light guiding lens 4 to be positioned at higher precision during its manufacturing stage.

Furthermore, if a conventional illumination device uses such a connector, random light may be directed in part to the connector, thereby deteriorating the light utility efficiency due to optical loss. On the contrary, the illumination device 1 of this modified example 3 can properly and precisely control the light to be incident on and enter the light guiding lens 4 without optical loss.

Modified Example 4

Figure 8:
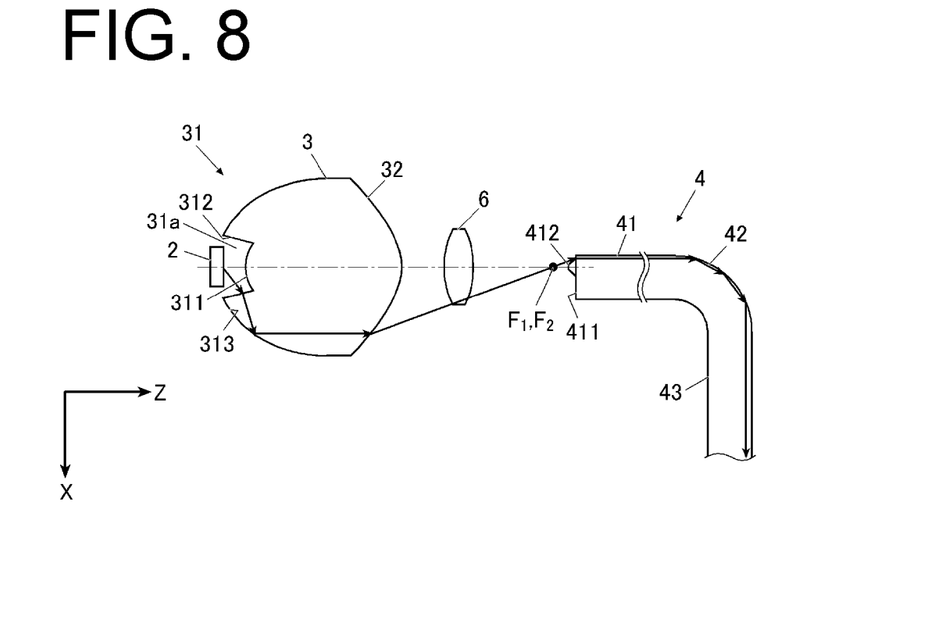
FIG. 8 is a diagram illustrating a modified example 4 of the illumination device in the exemplary embodiment.

In the illumination device 1 of the present exemplary embodiment, there may be disposed another optical system between the condenser lens 3 and the light guiding lens 4 as a third lens. FIG. 8 is a diagram illustrating a modified example 4 of the illumination device 1 in the exemplary embodiment wherein a lens 6 such as a doublet or a lens group for compensating aberration can be provided between the condenser lens 3 and the light guiding lens 4.

The additional optical system can improve the design degree of freedom for lenses, and can correct the possible aberration to improve the accuracy of the light controlling.

Modified Example 5

Figure 9:
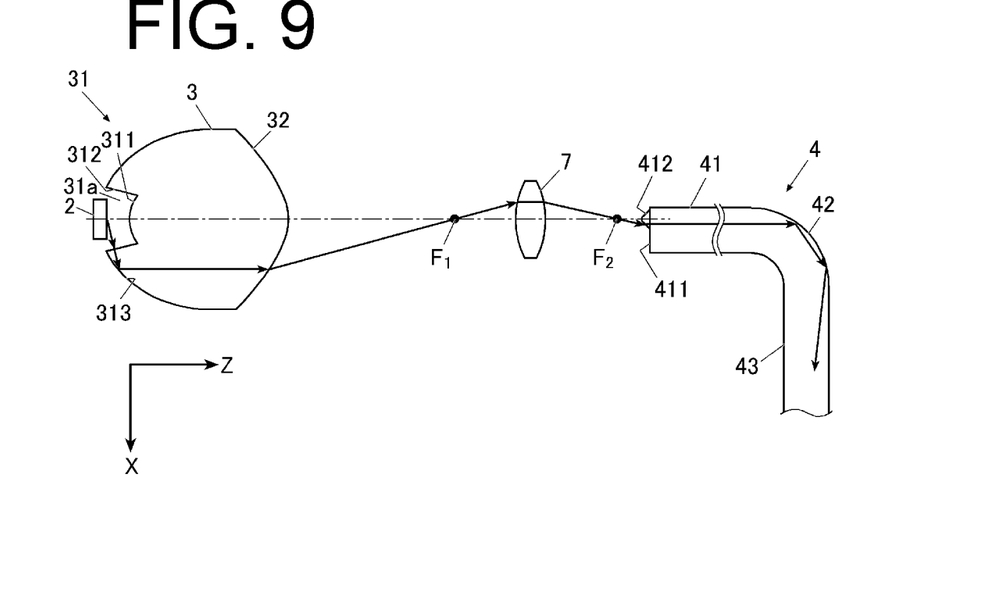
FIG. 9 is a diagram illustrating a modified example 5 of the illumination device in the exemplary embodiment.

The focal point $F_1$ of the light emission face 32 of the condenser lens 3 and the focal point $F_2$ of the incident face 412 of the light guiding lens 4 may not be coincident with each other. FIG. 9 is a diagram illustrating a modified example 5 of the illumination device 1 in the exemplary embodiment wherein the focal point $F_1$ of the light emission face 32 of the condenser lens 3 and the focal point $F_2$ of the incident face 412 of the light guiding lens 4 may be separated away from each other and there may be provided an additional lens 7 having a front focal point and a rear focal point that are coincident with the focal points $F_1$ and $F_2$, respectively.

This configuration can reduce the cost for manufacturing the optical system because the additional optical system improves the design degree of freedom for lenses resulting in no need to so high an optical accuracy for the respective lenses (optical systems).

Other Modified Examples

Figure 10A:
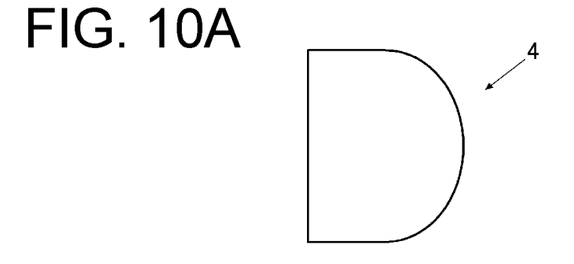
FIGS. 10A, 10B, 10C, and 10D are each a diagram illustrating a cross section of a modified example of the light guiding lens in the exemplary embodiment.
Figure 10B:
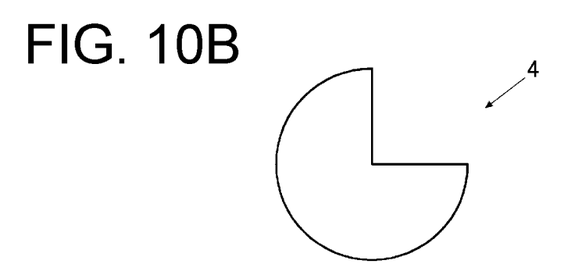
Figure 10C:
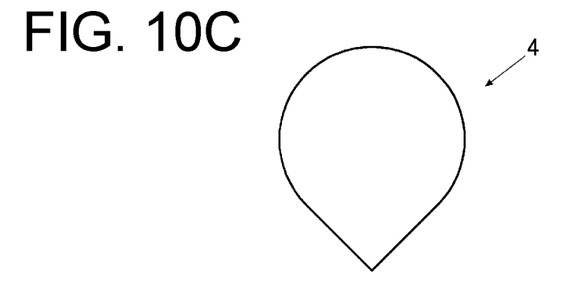
Figure 10D:
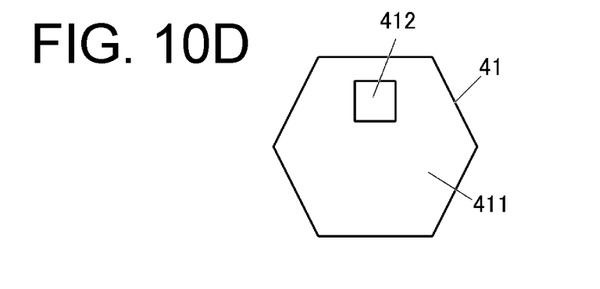

FIGS. 10A, 10B, 10C, and 10D are each a diagram illustrating a cross section of a modified example of the light guiding lens 4 in the exemplary embodiment. As illustrated, the cross section of the light guiding lens 4 is not limited to a circular shape but may be polygonal or a shape of a combination of a circle and a polygon. Furthermore, the cross section of the incident face 412 along the plane including the X and Y directions is not limited to a particular shape. As illustrated in FIG. 10D, the light guiding lens 4 with a polygonal cross section can be combined with an incident face 412 with a rectangular shape.

The first incident face 311, the second incident face 312, and the light emission face 32 of the condenser lens 3, the incident face 412 of the light guiding lens 4, etc. may be provided with an anti-reflection coating or a low-reflection coating formed thereon. This configuration can reduce the loss of light at that surface.

The condenser lens 3 can be omitted so that the light emitted from the LED 2 can be directly incident on the incident face 412 of the light guiding lens 4. This configuration can simplify the parts configuration and reduce the parts cost.

The light guiding lens 4 is not limited to a rod-shaped member having a long rod shape, but may be a light guiding plate as long as the light guiding lens 4 can be an elongated light guiding lens to guide light via a sharp bend portion.

The light guiding lens 4 may not include the light emission portion 44, but may guide the light to another light guiding member having a light emission portion.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. An illumination device comprising:
    an LED serving as a light source;
    a light guiding lens configured to guide light emitted from the LED, the light guiding lens including
        a light guiding portion configured to extend in a predetermined extension direction and have a first end face and a second end face so as to guide the light having entered the light guiding lens through the first end face in the extension direction,
        a bend portion configured to be continued from the second end face of the light guiding portion and bent in an arc shape, and
        an incident face disposed in the first end face of the light guiding portion, the incident face being configured to allow the light from the LED to enter the light guiding lens and to be incident on an inner surface of the bend portion on an outer side of the arc shape at an angle of incidence equal to or more than a critical angle;
    a condenser lens that is disposed between the LED and the light guiding portion of the light guiding lens and is configured to condense the light from the LED to the incident face; and
    a third lens disposed between the light guiding lens and the condenser lens.

2. The illumination device according to claim 1, further comprising a connection part configured to connect the light guiding lens and the condenser lens at respective side faces.

3. The illumination device according to claim 1, wherein the light guiding lens is a light guiding rod-shaped member having a long rod shape.

4. The illumination device according to claim 1, wherein the light guiding lens includes a light emission portion on an opposite side of the light guiding portion via the bend portion.

5. An illumination device comprising:
    an LED serving as a light source; and
    a light guiding lens configured to guide light emitted from the LED,
    the light guiding lens including:
        a light guiding portion configured to extend in a predetermined extension direction and have a first end face and a second end face so as to guide the light having entered the light guiding lens through the first end face in the extension direction;
        a bend portion configured to be continued from the second end face of the light guiding portion and bent in an arc shape; and
        an incident face disposed in the first end face of the light guiding portion, the incident face being configured to allow the light from the LED to enter the light guiding lens and to be incident on an inner surface of the bend portion on an outer side of the arc shape at an angle of incidence equal to or more than a critical angle, wherein
    the incident face is configured to allow the light from the LED to enter the light guiding lens while collimating the light substantially along the extension direction,
    the bend portion is configured to include a total reflection region on the inner surface thereof on the outer side of the arc shape where the light collimated along the extension direction can be incident on at the angle of incidence equal to or more than the critical angle,
    the incident face is disposed in the first end face in a position corresponding to a position within the total reflection region closer to the first end face,
    the illumination device further comprises a condenser lens that is disposed between the LED and the light guiding portion of the light guiding lens and is configured to condense the light from the LED to the incident face, and
    the condenser lens has an optical axis and the light guiding lens has a center axis arranged such that the optical axis of the condenser lens is deviated from the center axis of the light guiding lens and the light guiding lens has the incident face on the optical axis of the condenser lens.

6. The illumination device according to claim 5, further comprising a third lens disposed between the light guiding lens and the condenser lens.

7. The illumination device according to claim 6, wherein the light guiding lens is a light guiding rod-shaped member having a long rod shape.

8. The illumination device according to claim 5, further comprising a connection part configured to connect the light guiding lens and the condenser lens at respective side faces.

9. The illumination device according to claim 8, wherein the light guiding lens, the condenser lens, and the connection part are integrally formed together.

10. The illumination device according to claim 5, wherein the light guiding lens is a light guiding rod-shaped member having a long rod shape.

11. The illumination device according to claim 5, wherein the light guiding lens includes a light emission portion on an opposite side of the light guiding portion via the bend portion.

12. The illumination device according to claim 5, wherein the incident face is projected outward.

13. An illumination device comprising:
    an LED serving as a light source; and
    a light guiding lens configured to guide light emitted from the LED,
    the light guiding lens including:
        a light guiding portion configured to extend in a predetermined extension direction and have a first end face and a second end face so as to guide the light having entered the light guiding lens through the first end face in the extension direction;
        a bend portion configured to be continued from the second end face of the light guiding portion and bent in an arc shape; and an incident face disposed in the first end face of the light guiding portion, the incident face being configured to allow the light from the LED to enter the light guiding lens and to be incident on an inner surface of the bend portion on an outer side of the arc shape at an angle of incidence equal to or more than a critical angle, wherein the incident face is configured to allow the light from the LED to enter the light guiding lens while collimating the light substantially along the extension direction, the bend portion is configured to include a total reflection region on the inner surface thereof on the outer side of the arc shape where the light collimated along the extension direction can be incident on at the angle of incidence equal to or more than the critical angle, the incident face is disposed in the first end face in a position corresponding to a position within the total reflection region closer to the first end face, and the illumination device further comprises a condenser lens that is disposed between the LED and the light guiding portion of the light guiding lens and is configured to condense the light from the LED to the incident face, and a third lens disposed between the light guiding lens and the condenser lens.

14. The illumination device according to claim 13, further comprising a connection part configured to connect the light guiding lens and the condenser lens at respective side faces.

15. An illumination device comprising:
an LED serving as a light source; and
a light guiding lens configured to guide light emitted from the LED,
the light guiding lens including:
a light guiding portion configured to extend in a predetermined extension direction and have a first end face and a second end face so as to guide the light having entered the light guiding lens through the first end face in the extension direction;
a bend portion configured to be continued from the second end face of the light guiding portion and bent in an arc shape; and
an incident face disposed near the first end face of the light guiding portion, the incident face being configured to allow the light from the LED to enter the light guiding lens and to be incident on an inner surface of the bend portion on an outer side of the arc shape at an angle of incidence equal to or more than a critical angle, wherein
the incident face of the light guiding portion is disposed on an outer side face of the light guiding portion,
the light guiding portion includes, in the first end face, a total reflection face configured to totally reflect the light having entered through the incident face so as to be directed to and incident on the inner surface of the bend portion on the outer side of the arc shape at an angle of incidence equal to or more than the critical angle, and
the light guiding lens is a light guiding rod-shaped member having a long rod shape.

16. The illumination device according to claim 15, further comprising a condenser lens that is disposed between the LED and the light guiding portion of the light guiding lens and is configured to condense the light from the LED to the incident face.

17. The illumination device according to claim 16, further comprising a third lens disposed between the light guiding lens and the condenser lens.

18. The illumination device according to claim 15, further comprising a connection part configured to connect the light guiding lens and the condenser lens at respective side faces.

19. The illumination device according to claim 15, wherein the light guiding lens includes a light emission portion on an opposite side of the light guiding portion via the bend portion.

20. The illumination device according to claim 19, wherein the incident face is projected outward.

21. An illumination device comprising:
an LED serving as a light source; and
a light guiding lens configured to guide light emitted from the LED,
the light guiding lens including:
a light guiding portion configured to extend in a predetermined extension direction and have a first end face and a second end face so as to guide the light having entered the light guiding lens through the first end face in the extension direction;
a bend portion configured to be continued from the second end face of the light guiding portion and bent in an arc shape; and
an incident face disposed near the first end face of the light guiding portion, the incident face being configured to allow the light from the LED to enter the light guiding lens and to be incident on an inner surface of the bend portion on an outer side of the arc shape at an angle of incidence equal to or more than a critical angle, wherein
the incident face of the light guiding portion is disposed on an outer side face of the light guiding portion,
the light guiding portion includes, in the first end face, a total reflection face configured to totally reflect the light having entered through the incident face so as to be directed to and incident on the inner surface of the bend portion on the outer side of the arc shape at an angle of incidence equal to or more than the critical angle,
the light guiding lens is a light guiding rod-shaped member having a long rod shape, and
the light guiding lens has a center axis and a portion of the total reflection face at which the light is totally reflected to the inner surface of the bend portion is deviated from the center axis in a direction opposite to the outer side face of the light guiding portion where the incident face is disposed.

* * * * *